Patented Mar. 26, 1935

1,995,366

UNITED STATES PATENT OFFICE 1,995,366

METHOD OF FORMING SOLID FUEL BRIQUETTES

Foster Dee Snell, Brooklyn, N. Y.

No Drawing. Original application July 25, 1931, Serial No. 553,193. Divided and this application October 27, 1931, Serial No. 571,460

9 Claims. (Cl. 44—26)

The present invention has for an object to provide an improved fuel briquette and an improved commercially practicable method for producing such briquettes.

This application is a division of applicant's copending application Serial Number 553,193, filed July 25, 1931.

It is a prime requisite that the method to be commercially profitable must be operable at low cost and the product must be strongly bonded and not too brittle. It must hold together in the fire sufficiently for effective combustion and should not cause undue smoke, foul smelling or corrosive gases or foul the flues. Briquettes for general use should be sufficiently water-proof to stand weather conditions.

The present invention accomplishes the desired results by producing a method of forming briquettes in which a modified sodium silicate serves as a binder and water-proofing compound. Previous attempts have been made to form briquettes containing sodium silicate, but briquettes formed with sodium silicate alone as a binder will not sufficiently withstand exposure to moisture, since the sodium silicate is water soluble and is washed out by rain to such an extent that the briquette disintegrates. Silicic acid has also been tried, but without success, for while it is insoluble in water, it is not sufficiently effective as a binder.

In the illustrative embodiment to be more particularly described for the purposes of illustrating the principles of the invention, a binding and water-proofing agent is prepared by heating together a silicious grade of sodium silicate and silicic acid.

The silicic acid may conveniently be prepared as a gel by the addition of a strong mineral acid, such as sulphuric or hydrochloric acid, to sodium silicate. Preferably the sodium silicate used for the preparation of silicic acid is of the same grade as the sodium silicate with which the silicic acid is to be combined. The best results have been obtained by combining 85% of sodium silicate with 15% of silicic acid gel in which the sodium silicate used in the combination and also used in the preparation of the silicic acid gel has a ratio of $Na_2O:SiO_2$ of 1:3.25.

The silicic acid gel may be made by diluting sodium silicate to a 19° Baumé solution and adding the necessary amount of dilute mineral acid, such as sulphuric diluted to 12° Bé. or hydrochloric. Approximately ½ of the acid should be added slowly and the solution agitated vigorously during the addition. A thick pasty mass of silicic acid starts to form before all of the acid has been added. After the addition of the acid the stirring is discontinued and the gel allowed to form. The partially neutralized gel is then broken up in a suitable mixer by stirring and adding the balance of the dilute acid. The silicic acid gel so formed is completely neutralized and may contain approximately 16% of solid matter. A more concentrated gel would perhaps be more desirable in use but under ordinary conditions would be more difficult to prepare. To the silicic acid gel prepared as above is mixed sodium silicate in proportions of approximately 15% of the gel to 85% of sodium silicate. This mixture is heated in a suitable container, preferably an autoclave, to guard against loss of water by evaporation. It is stirred during the heating period until all of the silicic acid has dissolved or dispersed in the solution. The binder so produced may be called a modified sodium silicate (although the exact chemical structure of the binder is not definitely known) and is superior to any binder heretofore known in the art. This binder may be used to form briquettes of any suitable material, the proportion of binder used varying with the material and with the character of briquette required.

For preparation of a fuel briquette from anthracite culm it has been found desirable to use approximately one part of binder to 6 to 10 parts of culm together with ½ to 3 parts of water to aid in the mixing operation. If the proportion of binder is greatly in excess of these ratios difficulty will be encountered in molding the briquettes because of the tendency of the briquettes to adhere to the molds. On the other hand, if the proportion of the binder is much less than the above ratios the briquettes formed will be porous and weak. Probably the most satisfactory ratio for commercial use is one part of binder to seven parts of culm. In manufacturing the briquettes, dried culm is mixed with the binder in the proportion above stated and molded into briquettes at a pressure approximately 5,000 pounds per square inch. The briquettes are then baked in a suitable oven for about a half an hour at a temperature ranging, for example, from 250° F. at the start to 430° F. The temperature is raised from 250 to 430° F. in a period of approximately 15 minutes. It is held at 430° F. for 15 to 20 minutes.

The proportion of the silicic acid gel may, of course, be varied and especially it may be reduced if the culm or other material to be used in the briquette is of water-proof or water repellant character, or if a less waterproof character in the finished briquette would be acceptable.

It is one of the advantages of the binding material above described that coal briquettes can be satisfactorily produced without pre-treating of the culm before briquetting. If, however, it is desired to produce briquettes which will withstand more severe conditions of exposure, the culm may first be treated with a suitable water-proofing material, such pre-treating being ordinarily preferable in commercial practice to a procedure involving treating the formed briquettes with water-proofing material. In practice a water-proofing compound consisting of 5.6 lbs. hide glue, 1.6 lbs. japan wax, 4.8 lbs. soda soap, 1.75 lbs. alum, 1 gallon denatured alcohol, 2.6 ounces formaldehyde and 84 gallons water, has been found advantageous as providing satisfactory water-proofing qualities without undue expense. The amount used will depend upon the effect desired. For briquettes to be used commercially under usual conditions satisfactory results can be obtained by treating the culm with from ½ to 1 gallon per 100 pounds of culm.

Briquettes manufactured from anthracite culm, as above described, both with and without the preliminary water-proofing treatment suggested, burn freely without the formation of clinker and retain their shape as combustion proceeds. The ash content of the anthracite fuel is increased only very slightly and the fusion temperature of the ash is not appreciably lowered.

A briquette formed by the process hereindisclosed has a uniform water-proof bond throughout its entire mass, and in this respect the briquette is superior to any commercially practicable briquette heretofore produced.

Anthracite briquettes prepared as above when subjected to a steady shower of water for 24 hours do not disintegrate and the wet briquettes when broken will show a clean fracture with smooth outer surfaces showing no evidence of erosion or disintegration. Approximately 10% to 12% of moisture is absorbed during such treatment. The strength of the briquette when wet will be such as to resist approximately 70 pounds pressure per square inch and after drying the strength is equal to that possessed before exposure to the shower.

The foregoing particular description is illustrative merely and is not intended as defining the limits of the invention.

I claim:

1. The method of forming a solid fuel briquette, which comprises preparing silicic acid gel by diluting sodium silicate having a ratio of $Na_2O:SiO_2$ of approximately 1:3.25, adding dilute mineral acid to the solution, combining the silicic acid gel with sodium silicate having a ratio of $Na_2O:SiO_2$ of approximately 1:3.25 in a proportion of the order of 15% of silicic acid gel and 85% of sodium silicate and heating the mixture to disperse the silicic acid in the solution, mixing the binder with coal in a proportion of the order of 1 part of binder for 6 to 10 parts of coal and molding the mixture under pressure into briquettes, and baking the briquettes at a temperature of the order of 250° F. to 430° F.

2. The method of forming a solid fuel briquette, which comprises mixing and heating together sodium silicate and silicic acid gel in a proportion of the order of 85% of sodium silicate to 15% of silicic acid gel to form a binder, mixing the binder with anthracite culm in a proportion of the order of 1 part of binder for 6 to 10 parts of culm, and molding the mixture under pressure into briquettes.

3. The method of forming a solid fuel briquette, which comprises mixing and heating together sodium silicate and silicic acid gel in a proportion approximating 85% of sodium silicate to 15% of silicic acid gel to form a binder, mixing the binder with anthracite culm in a proportion of the order of 1 part of binder for 6 to 10 parts of culm, molding the mixture under pressure into briquettes, and baking the briquettes.

4. The method of forming a solid fuel briquette, which comprises mixing and heating together sodium silicate and silicic acid gel in a proportion approximating 85% of sodium silicate to 15% of silicic acid gel to form a binder, mixing the binder with anthracite culm, molding the mixture under pressure into briquettes, baking the briquettes at a temperature raised gradually from 250° F. to 430° F. during approximately 15 minutes, and continuing baking at 430° F. for approximately 15 to 20 minutes.

5. The method of forming a solid fuel briquette, which comprises mixing anthracite culm with a water-proofing substance, heating together sodium silicate and silicic acid gel in a proportion approximating 85% of sodium silicate to 15% of silicic acid gel until the silicic acid has dispersed in the solution to form a binder, mixing the binder with anthracite culm, molding the mixture under pressure into briquettes, and baking the briquettes.

6. The process of producing a solid fuel briquette, which comprises heating anthracite culm with a water-proofing agent comprising hide glue, soda soap, japan wax and alum adding a binder consisting of sodium silicate and silicic acid gel in a proportion of the order of 85% of sodium silicate to 15% of silicic acid gel heated together to form a homogeneous solution, mixing the binder with the culm mixture, compressing the combined material into briquettes, and baking the briquettes for approximately one-half hour at a temperature approximating 250° F. at the start and rising to approximately 430° F. for the latter portion of the baking.

7. The method of forming a binder for making fuel briquettes, which comprises preparing silicic acid gel by diluting sodium silicate having a ratio of $Na_2O:SiO_2$ of approximately 1:3.25, and adding dilute mineral acid to the solution, combining the silicic acid gel with sodium silicate having a ration of $Na_2O:SiO_2$ of approximately 1:3.25, the ration of sodium silicate to silicic acid gel being of the order of 85% to 15%, and heating the mixture to disperse the silicic acid in the solution.

8. A binder consisting essentially of sodium silicate and silicic acid gel in a proportion of the order of 85% of sodium silicate to 15% of silicic acid gel, the two compounds being dispersed in solution substantially as described.

9. A bonding material for coal briquettes containing silicic acid gel and sodium silicate wherein the proportion of silicic acid gel to sodium silicate is of the order of 15% to 85%, and wherein the silicic acid gel is the reaction product of sodium silicate having a ratio of $Na_2O:SiO_2$ of 1:3.25 and dilute mineral acid and wherein the sodium silicate has a ratio of $Na_2O:SiO_2$ of 1:3.25.

FOSTER DEE SNELL.